P. M. F. DUGIT-GROS, CALLED M. DUGIT.
MEASURING APPARATUS.
APPLICATION FILED JULY 18, 1919.

1,433,536.

Patented Oct. 31, 1922.
3 SHEETS—SHEET 1.

Inventor
Pierre Maurice François Dugit-Gros
By
B. Singer, Atty.

P. M. F. DUGIT-GROS, CALLED M. DUGIT.
MEASURING APPARATUS.
APPLICATION FILED JULY 18, 1919.

1,433,536.

Patented Oct. 31, 1922.
3 SHEETS—SHEET 2.

Inventor-
Pierre Maurice François Dugit-Gros
By
R. Singer, Atty

Patented Oct. 31, 1922.

1,433,536

UNITED STATES PATENT OFFICE.

PIERRE MAURICE FRANÇOIS DUGIT-GROS, CALLED MAURICE DUGIT, OF LYON, FRANCE.

MEASURING APPARATUS.

Application filed July 18, 1919. Serial No. 311,765.

*To all whom it may concern:*

Be it known that I, PIERRE MAURICE FRANÇOIS DUGIT-GROS, called MAURICE DUGIT, residing at Lyon, France, have invented new and useful Improvements in Measuring Apparatus, of which the following is a specification.

The invention relates to an indicator device applicable to the apparatus used for measuring quantities depending on two variable factors. This device comprises two movable hands, at least one of which is curved, the said two hands turning about one and the same spindle in accordance with the changes in the two factors. Their point of intersection gives on a network of graduated curves, the value of the quantity to be measured.

In the accompanying drawing Figures 1–3 show by way of example an apparatus intended to measure the speed of an air craft, provided with an indicator device according to the invention. Figure 1 is a vertical section, Figure 2 a plan and Figure 3 a plan showing diagrammatically the driving gear for the hands.

Figure 1:
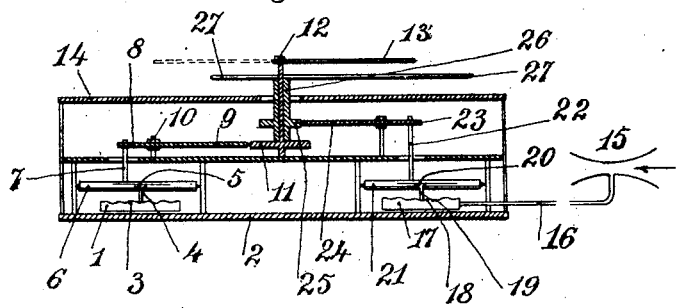
Figure 2:
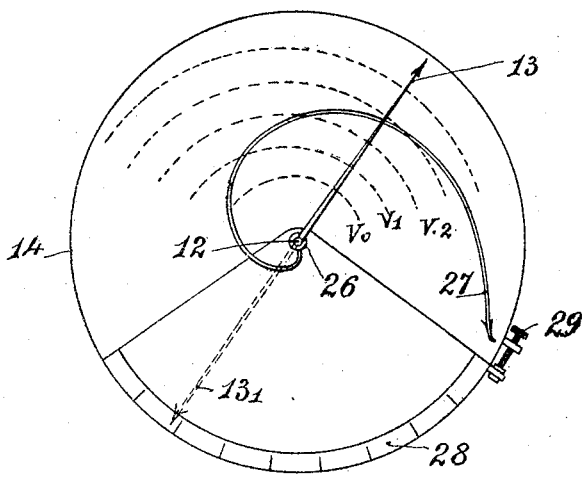
Figure 3:
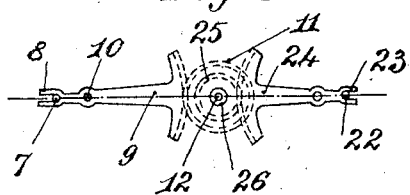

The apparatus shown in Figures 1–3 gives the speed V of an air craft relatively to the air, the said speed being considered as a function of two independent variable factors: of the pressure $p$ of the relative current of air, and of the density $a$ of the surrounding air: $V = f(p, a)$.

The apparatus comprises therefore:

1. A barometric organ or part the movements of which depend on variations of the density $a$ of the air.

2. An anemometric part affected by variations of the pressure $p$ of the relative current of air.

3. An indicator device with two hands which combine the actions of the two organs and enable the valve V of the speed to be measured, to be read direct.

A chamber 1 in which vacuum has been produced, rests on the base 2 forming the bottom of the apparatus. This chamber is closed by an aneroid diaphragm 3 which is more or less curved according to the value of the atmospheric pressure, and therefore of the density of the air. It carries a spindle 4 which transmits deformations of the diaphragm to a finger 5 carried by an oscillating plate 6 which has bearing 6ª.

The latter carries another finger 7 which engages with a fork 8 secured to a tooth rack 9 pivoted about a fixed pin 10. This tooth rack engages with a pinion 11 secured to a spindle 12 which carries a hand 13—rectilinear in the construction shown in Figure 2. This hand is moving in front of a fixed disc 14 forming a dial.

The relative current of air, due to the movement of the air craft, is admitted into a Venturi funnel 15 connected by a piping 16 to a chamber 17 closed by an elastic diaphragm 18. The depression produced in the chamber 17, is a function of the anemometric pressure $p$ of the relative current of air.

The movements of the diaphragm 18 are transmitted as before, by spindle 19, finger 20, oscillating plate 21 and another finger 22, to the fork 23 of the tooth rack 24. The latter meshes with a pinion 25 which is mounted on a sleeve 26 concentric with the spindle 12 and loose on the said spindle. The bearings of plate 21 are indicated at 21ª.

The sleeve 26 carries a curved hand 27 moving, like the hand 13, in front of the dial 14. The curvature or the dimensions of the hand 27, as well as the ratios of transmission of the mechanism, are calculated in such a manner that the two hands 13 and 27 always intersect each other above the dial 14.

The intersection of the two hands 13 and 27 makes it possible to measure the speed of the air craft which is a function of $p$ and $a$.

To that end on the dial 14 is drawn a curve representing the place of the points of intersection of the hands 13 and 27, corresponding to a given speed V⁰, and the same proceeding has been followed for graduated speeds V¹, V²... so as to obtain a network of curves corresponding to these various speeds.

In order to obtain the speed of the air craft, it will be sufficient to read the number marked on the curve of the network, at the point where the two hands intersect. When the said hands intersect between two curves, the speed is determined by interpolation.

A hand 13' secured to the hand 13 and arranged for instance in its extension, can be used for indicating the altitude. This hand 13' which is painted a special colour in order to avoid any confusion with the hand 13, moves in front of a graduated sector 28, the angle of keying of which can be modified for instance by means of a screw 29, so as to take into account the altitude of the initial station, or local variations of the atmospheric pressure.

In the same way, the hand 27 could be utilized to indicate the air pressure which is read on a special graduation opposite the point of the hand 27.

In the construction in Figure 2, the hand 13 has been made rectilinear, and the hand 27 curved. It goes without saying that these shapes could be modified, provided that the two hands movable about one and the same spindle, intersect opposite the network of curves and thus enable the value of the quantity to be measured, to be otained.

By adopting suitable shapes of hands, it will possible to obtain simple outlines, easy to draw, for the so called iso-line curves which correspond to graduated values of the quantity to be measured.

Figure 4:
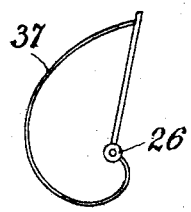
Figures 4–6 show different constructions of the hands.
Figure 5:
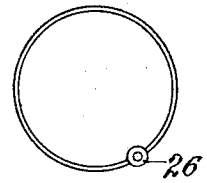
Figure 6:
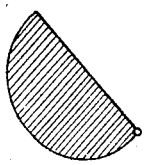
Figure 9:
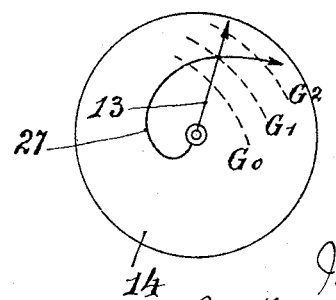
Figures 9 and 10 show a recording device.

It is possible for instance to utilize for the hand 27 a spiral shape, as shown in Figures 2 and 4, or a circumference of an arc of circumference, movable about one of its points (Figures 5 and 6).

Figure 7:
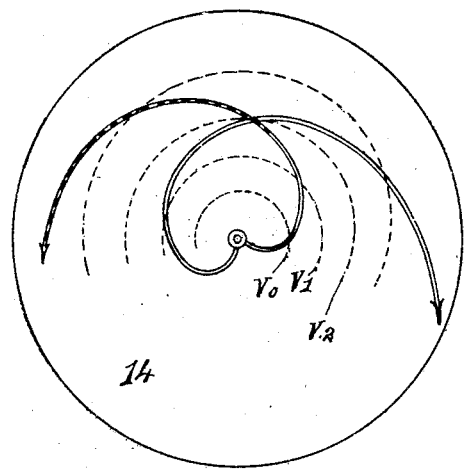
Figure 7 shows an indicator device with two curved hands.

The two hands, instead of being one rectilinear and the other curved, as shown in Figure 2, could both be curved as shown in Figure 7, the curves $V^0, V^1, V^2 \ldots$ being drawn accordingly.

The hands could be made in various ways. Hands could be used, the ends of which are free as shown in Figures 2 and 7, or a metal rod could be used, the end of which is connected to the central sleeve 26 by a radial rod, as shown in Figure 4. Also, the outline of a plate (Figure 6) could be used as an indicator curve.

It is also possible to utilize, as an indicator device, straight or curved lines in place of the hands, traced on transparent plates pivoted about one and the same spindle.

Figure 8:
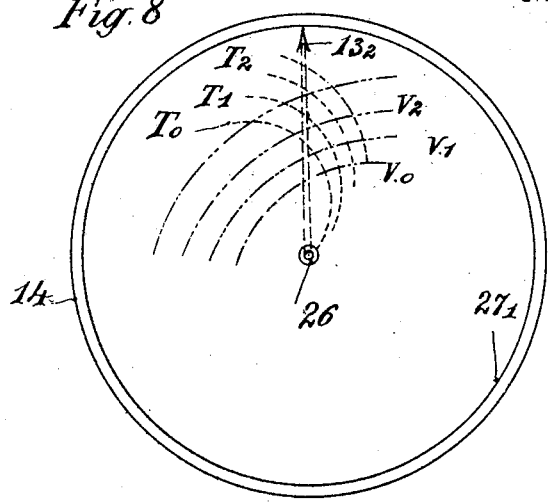
Figure 8 shows a modified construction in which one of the hands is replaced by a network of curves.

In order to make a certain correction, it may be advantageous to replace the curve traced on one of the discs, by a network of curves, each corresponding to a particular experimental condition. In the case, for instance, of a speed indicator, on the sleeve 26 which moves in accordance with variations of anemometric pressure, could be mounted, as shown in Figure 8, a transparent disc 27 on which is traced a network constituted by curves $T^0, T^1, T^2 \ldots$ corresponding to different temperatures.

The hand 13 moving as before under the action of variations of barometric pressure, in order to obtain the speed at any desired moment, first is read on a thermometer the temperature $t^2$ for instance, and then the speed is read on the network of curves $V^0, V^1, V^2 \ldots$ opposite the intersection of the curve $t^2$ and of the hand 13.

In the apparatus used for measuring speeds, which is shown in Figures 1–3, it is obviously possible to modify in any suitable manner the parts transmitting the movements of the diaphragms 3 and 18 to the indicator hands.

It goes without saying that the application to the measuring of a speed, shown in Figures 1–3, has been given merely by way of example, that the indicator device according to the invention can be utilized for any apparatus measuring a quantity which is a function of two independent variable factors.

This device could namely be utilized in electricity for measuring power, one of the hands moving in accordance with variations of voltage, and the other in accordance with variations of strength of the current.

The same indicator device is also suitable for control apparatus, in order to make sure that a quantity remains constantly within given limits. That of the iso-lines which corresponds to the most favourable value, will be in such a case made very clearly visible on the network of curves, as well as the extreme limits, and the operator will act on his operating parts so as not to move away from the value which is to be maintained.

The indicator device according to the invention could be arranged so as to record the quantity measured. If it is desired for instance to apply the invention to a recording barometer, it will be sufficient to replace by a clock work the device, which in the case of Figures 1 and 3, drives the sleeve 26 carrying the hand 27.

Figure 10:
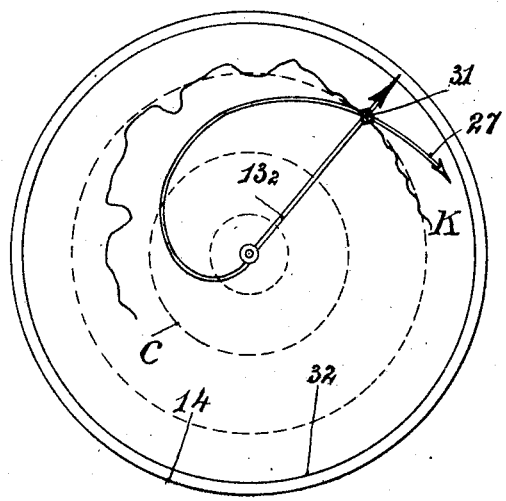

A stylo 30 (Figures 10 and 11) constituted by a frame through which pass the two hands 13 and 27, will trace on the dial 14 a curve P giving variations of speed as a function of time.

A network of curves $P^0, P^1, P^2$, will enable the values of the pressure to be determined at any desired moment from "the graphic".

Figure 11:
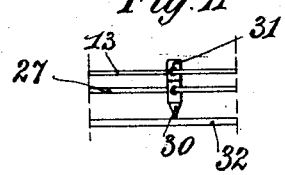
Figure 11 shows a recording device.

The stylus of the form of recording device shown in Fig. 11 comprises two parts, an upper part 31 and a lower part 30 carrying the indicating point. Each of these parts is provided with an aperture in which engages, as the case may be, the rectilinear hand 13 or the curvilinear hand 27.

The two parts 30 and 31 are preferably arranged movable with respect to each other, by means of a small central axis carried by one and entering a bearing provided in the other, the junction surfaces being plain.

I claim:

1. An indicator device applicable to measuring apparatus which gives the value of a quantity depending on two variable factors, said device comprising two concentrically mounted indicating elements arranged to intersect each other.

2. An indicator device applicable to measuring apparatus which gives the value of a quantity depending on two variable factors, said device comprising two concentrically mounted indicating elements arranged to intersect each other, one of said indicating elements being provided with a network of curved lines corresponding to different experimentally determined measures.

3. A pair of measuring instruments each including a movable element, and coacting concentrically mounted indicating devices each actuated by one of said movable elements.

In testimony whereof I affix my signature.

PIERRE MAURICE FRANÇOIS DUGIT-GROS,
dit MAURICE DUGIT.

Witnesses:
MARIN VACHON,
L. ESCHER.